Patented Apr. 9, 1929.

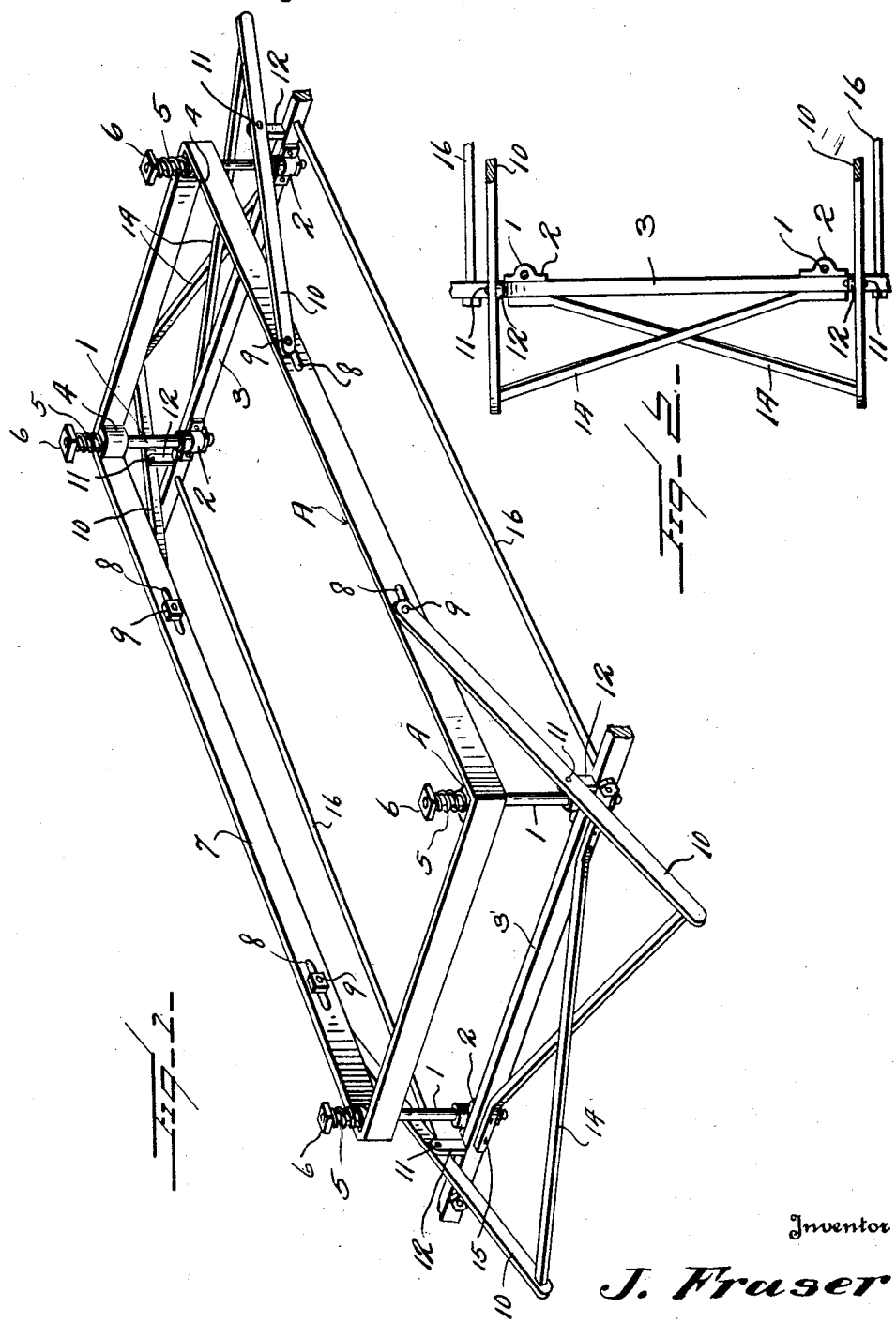

1,708,217

UNITED STATES PATENT OFFICE.

JOHN FRASER, OF BROOKLYN, NEW YORK.

VEHICLE CHASSIS.

Application filed September 29, 1927, Serial No. 222,845. Renewed September 13, 1928.

This invention relates to a vehicle chassis and primarily it is an object of the invention to improve the structure shown in my Patent No. 1,495,171 dated May 27, 1924 wherein the construction and arrangement of parts is such to effectively distribute the strain and wherein the torsion members are so positioned to offer no hindrance or obstruction to the mechanism adapted to be positioned directly below the chassis.

The invention consists in the details of construction and in the combination and arrangement of the several parts of my improved vehicle chassis whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in perspective of a chassis constructed in accordance with an embodiment of my invention;

Figure 2 is a fragmentary view in top plan of an end portion of the chassis as herein set forth.

As disclosed in the accompanying drawing, A denotes a frame of requisite dimensions and configuration but herein set forth as rectangular. The corners of the frame A have depending therefrom the rods 1, each of which are fixedly secured to a member 2 carried by an axle 3. In the drawing, each of the axles 3 is shown in a conventional manner but it is to be understood that in practice the same may be constructed in any manner desired and may also constitute a casing.

Each of the rods 1 above the member 4 is encircled by an expansible member 5, herein shown as a coil spring although, if preferred, a rubber washer may be used. This expansible member is interposed between the member 4 and an enlargement or head 6 arranged at the upper portion of the rod 1 and above the member 4. The expansible members 5 serve to absorb shocks which may occur upon relative movement of the frame A and axles 3 and the rods 1 provide means to limit the extent of upward movement of the frame. While the rods 1 herein disclosed as having their lower ends fixed to the axles 3 this arrangement, if desired, can be reversed as shown in my Patent No. 1,495,171 hereinbefore referred to. By the requisite adjustment of the nuts 6 the chassis height can be regulated as desired.

The rods 1 adjacent to the members 2 are also surrounded by the expansible members 5', herein disclosed as rubber washers although, if preferred, each of these members may constitute a coil spring. These members 5' function upon undue upward movement of the axles.

The members 2 are carried by the axles 3 and the lower portions of the rods 1 fixedly engage therewith.

Each of the side members 7 of the frame A at a desired distance inwardly of an end thereof is provided with a longitudinally disposed slot 8 through which is disposed for movement therealong a pin or bolt 9 carried by an end portion of an elongated rigid link or lever arm 10. The lever arm or link 10 is of a length to extend a desired distance beyond the adjacent axle 3 and at a predetermined point intermediate its ends the link or lever arm 10 is pivotally connected, as at 11, to an upstanding bracket 12 carried by an axle 3.

The outer extremity of each of the lever arms or links 10 has secured thereto an end portion of a torsion bar 14 that can be of one or more sections, the same being disposed inwardly in a transverse direction with respect to the frame A and anchored, as at 15, to the axle 3 at a point adjacent to the second link or lever arm 10 at the same end portion of the frame A.

The torsion bars 14 support the frame A in a way that will give a sensation as if suspended in the air and will materially modify the shocks and jars incident to travel.

It is to be noted that the bars 14 are disposed beyond the ends of the frame A thereby offering no hindrance or obstruction directly below said frame and thereby placing said bars in a more accessible and advantageous position.

The end portions of the axles 3 are tied or connected by the arms 16 which operate to counteract the torsional stress on the axles 3.

From the foregoing description it is thought to be obvious that a vehicle chassis constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A vehicle chassis comprising a frame, axles positioned below the frame adjacent the opposite ends thereof, rigid links operatively engaged with the frame and extending outwardly beyond adjacent axles, means for pivotally connecting each of the links intermediate its ends to an axle, and transversely disposed torsion bars, each of said bars being secured at one end portion to an axle and at its opposite end portion to a link.

2. A vehicle chassis comprising a frame, axles positioned below the frame adjacent the opposite ends thereof, rigid links operatively engaged with the frame and extending outwardly beyond adjacent axles, means for pivotally connecting each of the links intermediate its ends to an axle, and transversely disposed torsion bars, each of said bars being secured at one end portion to an axle and at its opposite end portion to a link, said bars being disposed transversely of the frame, the bars at each end being reversely related.

3. In combination, a frame, axles underlying the opposite end portions of the frame, rigid links operatively connecting the axles to the frame to permit the frame and axles to have up and down movement with respect to each other, and torsion bars connecting the links and the axles, said links being arranged in pairs at each end portion of the frame and extending in advance of the adjacent axle, the coacting torsion bars being secured to the outer end portions of the links.

In testimony whereof I affix my signature.

JOHN FRASER.